(12) United States Patent
Reijersen Van Buuren

(10) Patent No.: US 10,869,426 B2
(45) Date of Patent: Dec. 22, 2020

(54) MOWING DEVICE

(71) Applicant: Lely Patent N.V, Maassluis (NL)

(72) Inventor: Willem Jacobus Reijersen Van Buuren, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 348 days.

(21) Appl. No.: 15/823,090

(22) Filed: Nov. 27, 2017

(65) Prior Publication Data
US 2019/0159401 A1 May 30, 2019

(51) Int. Cl.
| | | |
|---|---|---|
| A01D 34/54 | (2006.01) |
| A01D 34/00 | (2006.01) |
| A01D 34/74 | (2006.01) |
| A01D 34/66 | (2006.01) |

(52) U.S. Cl.
CPC .......... A01D 34/54 (2013.01); A01D 34/008 (2013.01); A01D 34/74 (2013.01); *A01D 34/664* (2013.01)

(58) Field of Classification Search
CPC .. A01D 34/008; A01D 34/6806; A01D 34/68; A01D 34/74; A01D 34/54; A01D 41/141; A01D 41/127; A01D 75/185; A01D 75/287; A01D 34/664; B25J 9/1666; B62D 57/032
USPC ....... 56/10.2 R, 10.2 D, 10.2 E, 10.2 F, 13.7; 701/28, 36, 50
See application file for complete search history.

(56) References Cited

U.S. PATENT DOCUMENTS

| | | | |
|---|---|---|---|
| 8,666,550 B2 * | 3/2014 | Anderson | A01D 34/008 700/253 |
| 9,848,529 B2 * | 12/2017 | Franzius | A01D 34/008 |
| 10,034,421 B2 * | 7/2018 | Doughty | A01D 34/008 |

(Continued)

FOREIGN PATENT DOCUMENTS

| | | |
|---|---|---|
| EP | 1709859 A1 | 10/2006 |
| EP | 2340701 A2 | 7/2011 |

(Continued)

OTHER PUBLICATIONS

Fricke et al., "Assessment of forage mass from grassland swards by height measurement using an altrasonic sensor," Elsevier, Computers and Electronics in Agriculture, vol. 79, 2011, pp. 142-152, (Total pp. 12).

(Continued)

*Primary Examiner* — Robert E Pezzuto
(74) *Attorney, Agent, or Firm* — Birch, Stewart, Kolasch & Birch LLP

(57) ABSTRACT

A mower system for mowing a field with a grass containing crop comprises a frame, a mowing device that is connected to the frame and has an adjustable mowing height, a sensor device arranged to sense a species composition related parameter, such as a ration grass-to-clover, of a part of the field, and to generate data based on the sensed parameter, and a control device that is operatively connected to the sensor device to receive the generated data, and is operatively connected to the mowing device and arranged to adjust the mowing height on the basis of the received data. This enables to adjust the mowing height dynamically, i.e. position dependently, based on the detected parameter. The mowing height influences the regrowth of e.g. grass and clover differently, so that the ratio can be influenced locally.

20 Claims, 1 Drawing Sheet

(56) References Cited

U.S. PATENT DOCUMENTS 10,437,243 B2 * 10/2019 Blank .................. G06T 11/206
2003/0184747 A1 * 10/2003 Diekhans ............. A01D 41/127
342/123

FOREIGN PATENT DOCUMENTS

KR          101174344 B1     8/2012
WO    WO 2014/143446 A1     9/2014

OTHER PUBLICATIONS

Schils et al., "The Effect of Cutting Height and Management System on the Performance of a Grass/Cover Sward," Lowland Grasslands Subnetwork, FAO, Rome, 2002, 4 pages.

* cited by examiner

MOWING DEVICE

BACKGROUND OF THE INVENTION

The present invention relates to a mower system for mowing a field with a grass containing crop, and comprising a frame, and a mowing device that is connected to the frame and has an adjustable mowing height.

A mower system wherein the mower has an adjustable mowing height is widely known. It is also known in literature that the mowing height influences the regrowth of the mown crop, and that this may differ between crops.

In practice, this knowledge is used far from optimum when managing the crop.

It is an object of the present invention to provide an improved mower system that uses the knowledge to optimise the management of a crop that contains grass on a field. Herein, optimising may be understood to comprise the composition of the crop.

SUMMARY OF THE INVENTION

The invention achieves this object with a mower system according to claim 1, in particular a mower system for mowing a field with a grass containing crop, and comprising a frame, a mowing device that is connected to the frame and has an adjustable mowing height, a sensor device arranged to sense a species composition related parameter of a part of the field, and to generate data based on the sensed parameter, a control device that is operatively connected to the sensor device to receive the generated data, and is operatively connected to the mowing device and arranged to adjust the mowing height on the basis of the received data.

The invention is based on the following insight. Up to now, in virtually every case the mowing height was set once for all of the field. This does not allow control over the regrowth properties across the field, and might in fact lead to undesired regrowth, or contrarily to too little regrowth of the desired crop. Now, according to the invention, the mowing height is set based on a measured property, and the originally set mowing height may now be adjusted based on that measured property. This allows a much tighter and dynamic control over the regrowth properties of the crop.

In particular, grass is often mixed with clover, alfalfa or other forage legumes used for animal feed. This is done e.g. to improve grass growth due to their nitrogen fixating properties, but also since they provide forage crop themselves. Furthermore, growing such mixture also improves the nutritional state of the land, which is useful if after the grass-legume mixture some other crop is grown such as corn or vegetables. These other, later crops require less fertiliser for the same yield when previously it was covered with a grass-legume mixture. However, the ratio between grass and legume should be within certain bounds for an optimum result. Not only could a too high percentage of the legume cause the grass to grow less, but it may also lead to a decrease in the animal feed quality of the total forage crop, such as a too low nutritive value, a too high proteine content or the like, which is neither compensated by a better crop yield for a subsequent crop.

Thus, controlling the ratio is desirable, which is possible with the mower system of the invention, in that this may change the mowing height. E.g. mowing not too low favours regrowth of the grass, while mowing lower favours regrowth of clover. All this is elucidated further below.

In the present invention, the sensor device may be provided on the mower itself, or be a separate device, as long as the data is passed on to the mower. For example, the sensor device may be provided on a drone or other UAV, or on a separate vehicle, such as an AGV. Furthermore, "data" is deemed to comprise both "information" and "a signal". That is, the sensor device may process the value of the sensed parameter into information, store this information and supply the information for later use, or may pass a sensor signal one-to-one to some external device for processing. Herein, the processing may also comprise turning the signal into the information or may comprise directly controlling the setting of the mowing height based on the signal. For clarity reasons, these possibilities are dealt with as one by using the term data. Moreover, the "adjusting" is considered the same as "setting".

Further embodiments are described in the dependent claims, as well as in the part of the description that follows below.

In particular embodiments, the control device is arranged to adjust the mowing height during mowing the field, in particular repeatedly or continuously on the basis of the received data. In embodiments, the control device is arranged to adjust the mowing height for the part of the field for which the parameter was sensed, i.e. for which the data was generated. This allows the mowing height to be set dynamically and position dependently, based on the sensed parameter. In turn, this allows to control regrowth and thus the ratio of the different plants (in particular grass to forage legume, or others). After all, this ratio will not be the same across all of the field, and having a single mowing height does not do justice to such a variable ratio. By local measurement and control, optimum results may be achieved, in that a too low or too high ratio grass-to-legume may be corrected through setting a suitable mowing height.

In embodiments, the sensor device comprises a camera that generates an image of the piece of the field, and an image processing device that processes the image and generates the data. In embodiments, the image processing device is arranged to recognise at least one forage legume, in particular a clover species and/or alfalfa and/or lucerne, in the image, more in particular also to recognize grass in the image. In embodiments, the species composition related parameter comprises a ratio, in particular a coverage ratio of the field, of at least one of a forage legume, in particular a clover species and/or alfalfa and/or lucerne, to a grass, more in particular wherein the data reflects or comprises the ratio. Such a camera and image processing device provides good and per se proven technology for crop recognition. Reference is made to articles by Dr. Thomas Fricke, plant scientist, that describe various techniques to recognise such legumes in images of grass-legume mixtures. Such recognition may be based on the large differences in habitus between grass and legumes such as clover or lucerne. Grass is very slender and has narrow leaves and flowers, while clover has much broader, round leaves, and very recognisable flower heads, of a different colour as well. Nevertheless, any sensor that is able to differentiate between grass and another crop, in particular forage legumes such as clover, are possible.

In embodiments, the sensor device comprises an additional sensor, in particular an ultrasound sensor and/or an optical NIR sensor. Such additional sensor may support the sensing of the species composition related parameter(s). It may also serve to determine the height of the crop, and thus directly or indirectly also of the volume of the crop. Together with the information relating to the species composition, or at least of the ratio therebetween, it is possible to determine the nutritional composition of the mown crop. This may be done by multiplying the local amount of the crop and the percentages of the two or more crops, in particular of grass and legume (clover etc.). This gives the local yield for grass and legume, etc. With knowledge of the nutritional composition of each constituent, the total feed composition may be determined. By adding the local contributions for all of the mown part of the field, the total yield of the crop may also be determined. It is noted that the volume of the crop may be determined based on the image processing as well, since crop density may be determined, based on picture analysis. Alternatively, density information may be derived from mowing power. Together with the height information from the ultrasonic sensor or some other height sensor, total volume may easily be determined. The information thus obtained is very useful in further processing of the feed collected. After all, without knowledge of the constituents grass, legume, . . . , the total nutrients, that have different ratios for the various constituents, are not known.

In embodiments, the control device is arranged to contain a desired value or value range for the signal, in particular for the determined parameter value reflected by the data, more in particular for the ratio, to compare the data, in particular the determined parameter value, more in particular the ratio, and the desired value or value range, and to adjust the mowing height on the basis of the comparison. As indicated above, adjusting the mowing height such that a desired ratio or other species composition related parameter is achieved, is useful in the management of the crop, since that influences crop regrowth, nutritional value of the crop and even of the soil. Thus, by adjusting towards a desired value or value range, by comparison of measured and desired values, the crop management may be improved. Hereto, the desired value or value range may be contained in a memory that is either programmable or fixed, or may even be hardwired into the control device.

In embodiments, the control device is arranged to adjust the mowing height to a first mowing height value if the determined ratio is lower than a predetermined low threshold value, and to adjust the mowing height to a second mowing height value if the determined ratio is higher than a predetermined high threshold value, wherein the first mowing height is lower than the second mowing height. As already pointed out above, the differences in regrowth properties make it possible to influence that regrowth by adjusting the mowing height to what crop ratio is desired. Then, by setting thresholds, a simple control mechanism is obtained for setting mowing height. Alternatively, a more complex setting mechanism could be designed. For example, the control device is arranged to adjust the mowing height to a mathematical function of the determined ratio. That mathematical function may be selected depending on the regrowth properties of the particular crops on the field.

In embodiments, the first mowing height is lower than 6 cm, in particular about 5 cm, and wherein the second mowing height is higher than 6 cm, in particular about 7 cm. An often used mixture of crops is grass, in particular *Lolium perenne* or ×*hybridum, Festuca arundinacea,* ×Festulolium or *Dactylis glomerata*, and clover, in particular *Trifolium pratense* and *T. repens*, and their cultivars. Such clover shows a better regrowth than grass at lower mowing heights, such as 5 cm rounded off, while it is the other way around at higher mowing heights, such as about 7 cm rounded off, in each case above ground level. Of course, other heights may be used as well, depending on the specific type of crop, and the desired effects.

In embodiments, the mower is a towable mower, arranged to be towed behind a towing vehicle. An advantage hereof is that the sensor(s) and/or control s for evaluating the sensor data may be provided on the towing vehicle. This provides a distance, and thus an effective time delay, between the sensor and its determination of the species composition related parameter value, such as species ratio, with respect to the mower and the setting of the mowing height thereof. This allows the software some more time to do the calculations, and the mower to set the height correctly. However, it is also possible to use data/information that was collected previously with some other device, or even from aerial or satellite pictures, as long as the setting of the mowing height is adjusted position dependently, based on said data/information.

In other embodiments, the mower is an autonomous mower, and comprises a propelling system for propelling the mower over the field. For such embodiments, the mowing speed is often lower, and there is more time for setting the mowing height. Note that autonomous mowers will be able to mow more often than man-operated mowers. In this way, they can exert more, and a tighter, control over the composition of the crop. After all, in extreme cases it may make sense to mow more often, in an earlier stage. Of course, since regrowth is not instantaneous, there are natural upper limits to the mowing frequency, apart from economical or efficiency limits.

BRIEF DESCRIPTION OF THE DRAWINGS

The invention will now be elucidated by means of some non-limiting embodiment in the drawing, in which:

FIG. 1 is a very diagrammatic side view of a system 1 according to the invention. The system 1 comprises a tractor 2 with a hitch 3, to which a mower 4 is connected, that has a frame 5 and one or more mowing discs 6 with one or more knives 7, the mowing height of which is adjustable via a height setter 8.

DETAILED DESCRIPTION OF THE INVENTION

Figure 1:
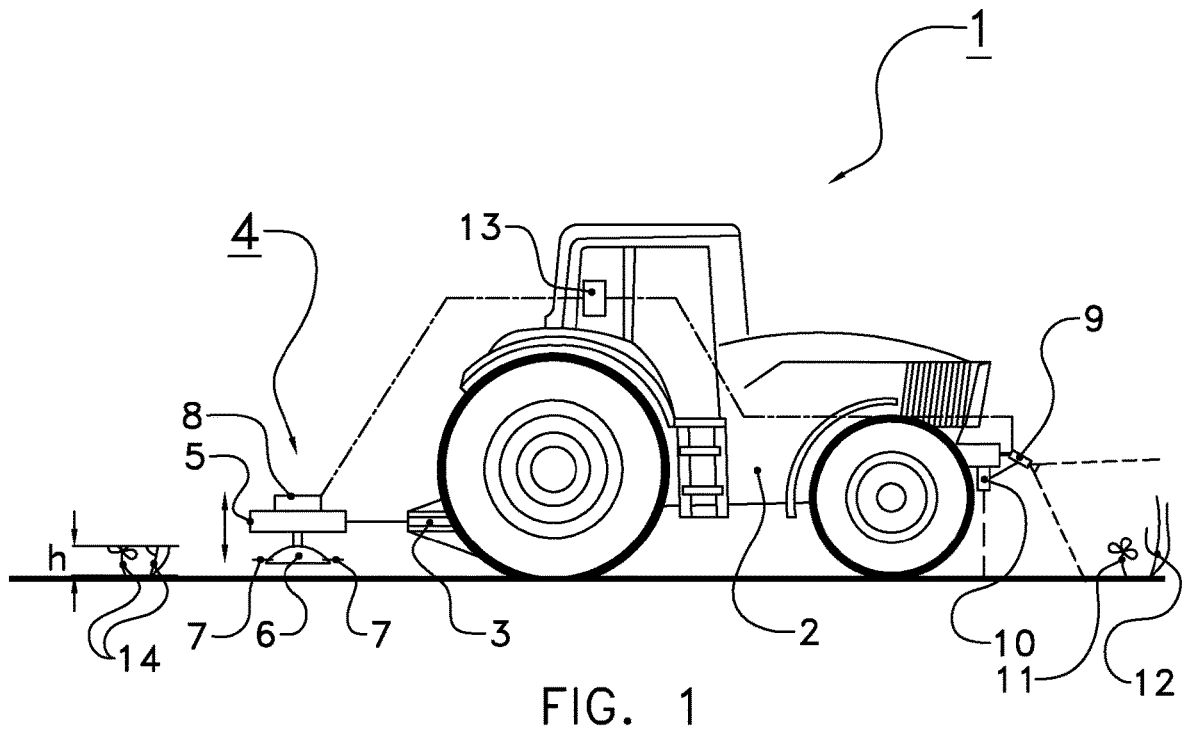
FIG. 1 is a very diagrammatic side view of a system according to the invention.

A camera is indicated with 9, and an ultrasonic, or ultrasound, sensor with 10. Crop on the field is diagrammatically indicated with a clover 11 and grass 12. Furthermore, a control device is indicated with reference numeral 134, while mown crop is indicated with 14.

The mowing system, which is here a towed mowing system, comprises a tractor, onto which a camera 9 is mounted. The camera images the filed in front of it, together with its crop, in this case a mixture of grass 12 and clover 11. The image is processed in the control device 13, with which the camera is operatively connected. Hereby, e.g. a ratio between grass and clover is detected in the crop, such as based on average are of crop with certain optical properties. This may be based on leaf shape, colour, flowers, reflectivity, even non-visual properties such as (near)infrared properties and so on. In this way, the control device 13 can establish that the crop comprises e.g. 25% clover area and 75% grass area. Assume now that a higher percentage of clover is desired. That means that clover regrowth must be favoured over grass regrowth. This can be achieved by setting the mowing height to a value which is relatively low, such as 5 cm. Thereto, the control device 13 instructs the height setter 8, such as a hydraulical or electrical actuator, to set the mowing height of the mowing disc 6 with the knives 7 to 5 cm. The time for determining the desired height from the imaged crop and setting the mowing height is about equal to the distance between the middle of the camera image and the mower 4 divided by the forward speed of the tractor 2, which is a feasible time for modern image processing software and height setters.

In addition, the ultrasound sensor 10 may be used to determine the height of the crop to be mown, and in particular also a crop density. Thereby, total crop volume may be determined, and together with the set mowing height, the volume of the crop that is mown can be determined. Together with information from the camera 9 and the image processing, the control unit 13 can then determine the composition of the mown crop, based on crop volume, crop composition and nutritive contribution of the crop constituents (here: grass and clover). The latter may be based on samples or literature.

Figure 2:
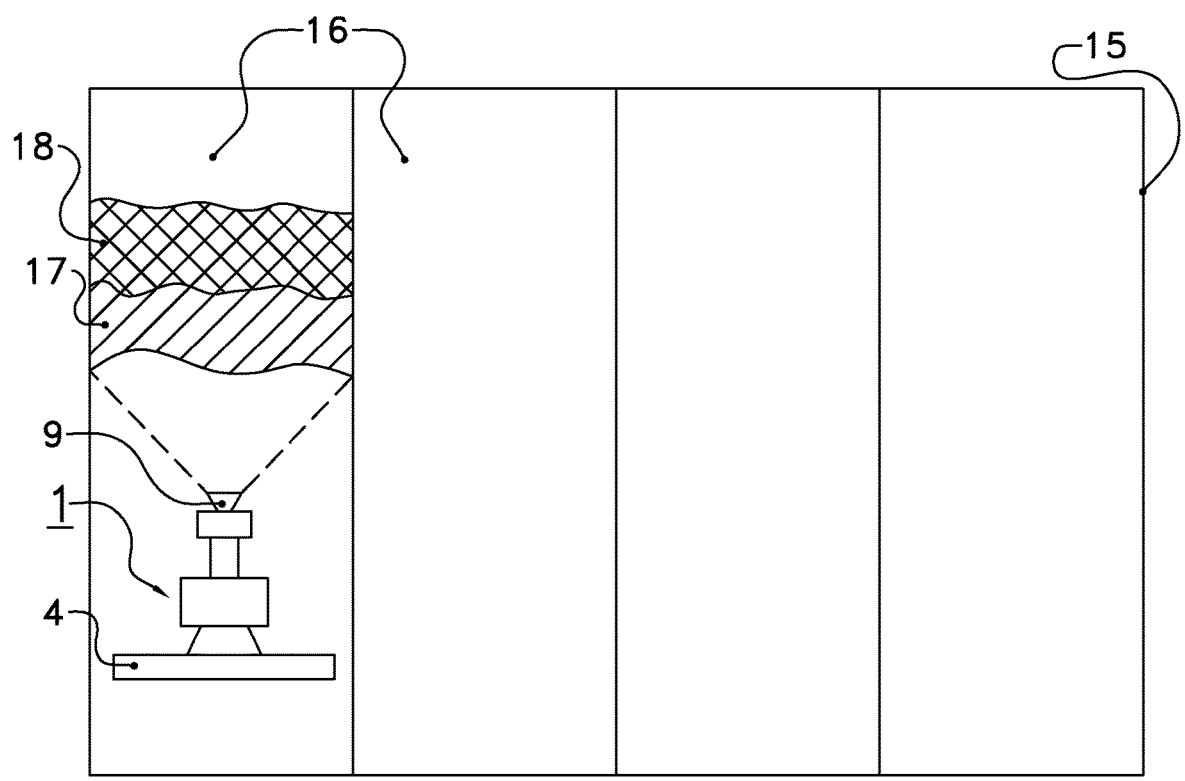
FIG. 2 is a very diagrammatic top view of a system according to the invention.

FIG. 2 is a very diagrammatic top view of a system according to the invention. It shows a system 1 according to the invention with a mower 4, mowing a track 16 in a field 15. The camera 9 at the instant depicted detects a part 17 of the field with generally a clover rich crop, designated by the hatched area, and after that a clover poorer area 18, depicted by a crosshatched area. In order to reduce relative clover cover in the area 17, the mowing height may be set relatively lower, such as at about 7 cm, while to increase relative clover cover for the area 18, the mowing height may be set at about 5 cm. This shows that the present invention is able to manage the crop locally, based on detected composition, by adjusting mowing height.

The invention claimed is:

1. A mower system for mowing a field with a grass containing crop, and comprising:
a frame;
a mowing device connected to the frame and having an adjustable mowing height;
a sensor device arranged to sense a species composition related parameter of a part of the field, and to generate data based on the sensed parameter; and
a control device operatively connected to the sensor device to receive the generated data, and operatively connected to the mowing device and arranged to adjust the mowing height on the basis of the received data,
wherein the species composition related parameter comprises a type of crop to be cut.

2. The mower system of claim 1, wherein the control device is arranged to adjust the mowing height during mowing of the field.

3. The mower system of claim 1, wherein the control device is arranged to adjust the mowing height for the part of the field for which the parameter was sensed.

4. The mower system of claim 1, wherein the sensor device comprises a camera that generates an image of the part of the field, and an image processing device that processes the image and generates the data.

5. The mower system of claim 1, wherein the control device is arranged:
to contain a desired value or value range for the determined parameter value reflected by the data;
to compare the determined parameter value and the desired value or value range; and
to adjust the mowing height on the basis of the comparison.

6. The mower system of claim 4, wherein the sensor device comprises an additional sensor.

7. The mower system of claim 6, wherein the additional sensor is an ultrasound sensor or an optical NIR sensor.

8. The mower system of claim 1, wherein the control device is arranged:
to contain a desired value or value range for data;
to compare the data and the desired value or value range to determine a ratio; and
to adjust the mowing height on the basis of the comparison.

9. The mower system of claim 8, wherein the control device is arranged to adjust the mowing height to a first mowing height value, if the determined ratio is lower than a predetermined low threshold value, and to adjust the mowing height to a second mowing height value, if the determined ratio is higher than a predetermined high threshold value, and
wherein the first mowing height is lower than the second mowing height.

10. The mower system of claim 9, wherein the first mowing height is lower than 6 cm, and wherein the second mowing height is higher than 6 cm.

11. The mower system of claim 1, wherein the mower is a towable mower, arranged to be towed behind a towing vehicle.

12. The mower system of claim 1, wherein the mower is an autonomous mower, and comprises a propelling system for propelling the mower over the field.

13. The mower system of claim 1, wherein the control device is arranged to adjust the mowing height during mowing of the field repeatedly or continuously on the basis of the received data.

14. The mower system of claim 9, wherein the first mowing height is lower than 5 cm, and wherein the second mowing height is higher than 7 cm.

15. The mower system of claim 2, wherein the control device is arranged to adjust the mowing height for the part of the field for which the parameter was sensed.

16. The mower system of claim 2, wherein the sensor device comprises a camera that generates an image of the piece of the field, and an image processing device that processes the image and generates the data.

17. A mower system for mowing a field with a grass containing crop, and comprising:
a frame;
a mowing device connected to the frame and having an adjustable mowing height;
a sensor device arranged to sense a species composition related parameter of a part of the field, and to generate data based on the sensed parameter; and
a control device operatively connected to the sensor device to receive the generated data, and operatively connected to the mowing device and arranged to adjust the mowing height on the basis of the received data,
wherein the sensor device is arranged to recognize at least one forage legume in the image.

18. The mower system of claim 17, wherein the at least one forage legume is a clover species, alfalfa or lucerne, and
wherein the image processing device is arranged to recognize the at least one forage legume and grass in the image.

19. A mower system for mowing a field with a grass containing crop, and comprising:
a frame;
a mowing device connected to the frame and having an adjustable mowing height;

a sensor device arranged to sense a species composition related parameter of a part of the field, and to generate data based on the sensed parameter; and a control device operatively connected to the sensor device to receive the generated data, and operatively connected to the mowing device and arranged to adjust the mowing height on the basis of the received data, wherein the species composition related parameter comprises a ratio of at least one of a forage legume to a grass.

20. The mower system of claim 19, wherein the ratio is a coverage ratio of the field, of the at least one of a forage legume to a grass, the at least one forage legume being a clover species, alfalfa or lucerne, and wherein the data reflects or comprises the ratio.

* * * * *